(12) United States Patent
Suga

(10) Patent No.: US 9,170,759 B2
(45) Date of Patent: Oct. 27, 2015

(54) INFORMATION PROCESSING APPARATUS, INFORMATION PROCESSING METHOD AND NON-TRANSITORY COMPUTER-READABLE STORAGE MEDIUM

(75) Inventor: Tomoaki Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 13/238,364

(22) Filed: Sep. 21, 2011

(65) Prior Publication Data

US 2012/0096341 A1 Apr. 19, 2012

(30) Foreign Application Priority Data

Oct. 15, 2010 (JP) ................................. 2010-232784

(51) Int. Cl.
G06F 17/00 (2006.01)
G06F 3/12 (2006.01)

(52) U.S. Cl.
CPC ............ *G06F 3/1204* (2013.01); *G06F 3/1205* (2013.01); *G06F 3/1246* (2013.01); *G06F 3/1253* (2013.01); *G06F 3/1289* (2013.01); *G06F 3/125* (2013.01); *G06F 3/1219* (2013.01)

(58) Field of Classification Search
CPC ............................. G06F 3/1205; G06F 3/1208
USPC .......................................... 715/234; 358/1.18
See application file for complete search history.

(56) References Cited

U.S. PATENT DOCUMENTS

| 6,163,784 | A | * | 12/2000 | Taguchi | ........................ | 715/255 |
|---|---|---|---|---|---|---|
| 6,812,926 | B1 | * | 11/2004 | Rugge | ........................... | 345/440 |
| 7,249,319 | B1 | * | 7/2007 | Payne et al. | .................... | 715/209 |
| 7,685,514 | B1 | * | 3/2010 | Khatwani et al. | ............. | 715/251 |
| 8,351,101 | B2 | * | 1/2013 | Han et al. | ....................... | 358/538 |
| 8,678,588 | B2 | | 3/2014 | Makihira et al. | | |
| 2002/0135806 | A1 | | 9/2002 | Yoshino | | |
| 2003/0023630 | A1 | * | 1/2003 | Barmettler | ..................... | 707/513 |
| 2004/0174563 | A1 | * | 9/2004 | Cassidy et al. | .............. | 358/1.18 |
| 2005/0262441 | A1 | * | 11/2005 | Yoon | ............................. | 715/526 |
| 2007/0050703 | A1 | * | 3/2007 | Lebel | ............................ | 715/513 |
| 2008/0046833 | A1 | * | 2/2008 | Patz et al. | ..................... | 715/769 |

(Continued)

FOREIGN PATENT DOCUMENTS

| AU | 2004201773 | * | 6/2004 | ............... G06F 3/12 |
|---|---|---|---|---|
| JP | 2002-351636 A | | 12/2002 | |
| JP | 2010-261858 A | | 11/2010 | |

OTHER PUBLICATIONS

Conditional formatting based on meeting multiple criteria, Sep. 2009, pp. 1-9 http://www.mrexcel.com/forum/excel-questions/417790-conditional-formatting-based-meeting-multiple-criteria.html.*

(Continued)

*Primary Examiner* — Scott Baderman
*Assistant Examiner* — Mario M Velez-Lopez
(74) *Attorney, Agent, or Firm* — Fitzpatrick, Cella, Harper & Scinto

(57) ABSTRACT

An information processing apparatus acquires a structured document containing a plurality of elements, specifies, in accordance with an instruction from a user, a partial element group from the plurality of elements contained in the acquired structured document, and selects, in accordance with the content of each of the plurality of elements included in the specified element group, an output-target element from the plurality of elements included in the element group.

26 Claims, 10 Drawing Sheets

(56) References Cited

U.S. PATENT DOCUMENTS

| | | | |
|---|---|---|---|
| 2009/0021790 A1* | 1/2009 | Krovitz et al. | 358/1.18 |
| 2009/0138810 A1* | 5/2009 | Howard et al. | 715/760 |
| 2009/0193336 A1* | 7/2009 | Ko et al. | 715/274 |
| 2010/0005087 A1* | 1/2010 | Basco et al. | 707/5 |
| 2010/0281351 A1* | 11/2010 | Mohammed | 715/205 |
| 2011/0029859 A1* | 2/2011 | Igari | 715/234 |
| 2011/0035657 A1* | 2/2011 | Aoki | 715/234 |
| 2012/0079390 A1* | 3/2012 | Ballagh et al. | 715/738 |
| 2013/0159889 A1* | 6/2013 | Zheng et al. | 715/760 |

OTHER PUBLICATIONS

Lim, S. et al., Automatic Selecfion of Print-worthy Content for Enhanced Web Page Printing Experience, Conference: Proceedings of the 2010 ACM Symposium on Document Engineering, Manchester, United Kingdom, Sep. 21-24, 2010. http://dl.acm.org/citation.cfm?doid=1860559.1860592.*

* cited by examiner

FIG. 7

```
!DOCTYPE html PUBLIC "-//XXX//DTD XHTML 1.0 Trasitional//DN" "http://xxx.xxx/TR/xhtml1/DTD/Xhtml1-transitional.dtd">
<html xmlns="http://www.xxx.xxx/xxx/xhtml" xml:lang="ja" lang="ja">
<head>
<meta http-equiv="Content-Type" content="text/html;charset=UTF-8"/>
<link rel="stylesheet" type="text/css" href="top_j.css"/>
<title>SAMPLE PAGE</title>
</head>
<body>
<div id="head">
<p>2008/01/01</p>
</div>
<div id="container">
<div id="menu">
<ul>
<li><a href="top_01.html">PRODUCT INFORMATION</a></li>
<li><a href="top_02.html">SOLUTION</a></li>
<li><a href="top_03.html">SUPPORT</a></li>
<li><a href="top_04.html">DOWNLOAD</a></li>
<li><a href="top_05.html">EVENT</a></li>
</ul>
</div>
<div id="category">
<ul>
<li><a href="/product/camera/index.html"><img src="images/button_camera.gif" alt="CAMERA" border="0"></a></li>
<li><a href="/product/printer/index.html"><img src="images/button_printer.gif" alt="PRINTER" border="0"></a></li>
<li><a href="/product/copy/index.html"><img src="images/button_scanner.gif" alt="COPY" border="0"></a></li>
<li><img src="/product/other/index.html"><"images/button_other.gif" alt="OTHER" border="0"></li>
</ul>
</div>
</div>

·······

</body>
</html>
```

INFORMATION PROCESSING APPARATUS, INFORMATION PROCESSING METHOD AND NON-TRANSITORY COMPUTER-READABLE STORAGE MEDIUM

BACKGROUND OF THE INVENTION

1. Field of the Invention

The present invention relates to an information processing apparatus, an information processing method and a non-transitory computer-readable storage medium.

2. Description of the Related Art

By accessing Web pages on the Internet, users acquire a variety of information. A Web page is composed of a structured document described in a structured language such as HTML (HyperText Markup Language) or XHTML (Extensible HyperText Markup Language). A user refers to a Web page using software referred to as a "browser", which corresponds to a display of such a structured document.

When a Web page is printed, there are cases where the user desires to print not the entire Web page but only a region that is a portion thereof. Many techniques for printing such a partial region of a Web page are known. An example of such a known technique is to adopt only the region of the Web page that is being displayed in the browser window at the time of print execution as the object of printing and to perform printing that is based upon image data representing the region that is the object of printing (see the specification of Japanese Patent Laid-Open No. 2002-351636).

If the user is to cause a desired region of a Web page to be output in accordance with the technique described in Japanese Patent Laid-Open No. 2002-351636 cited above, the user must first cause only the region of the Web page that is desired as the object of output to be displayed in the browser window.

SUMMARY OF THE INVENTION

The present invention provides a technique adapted so as to allow a user to readily select a desired region that is to be output from a Web page.

According to a first aspect of the present invention, there is provided an information processing apparatus comprising: an acquisition unit configured to acquire a structured document containing a plurality of elements; a specification unit configured to specify, in accordance with an instruction from a user, a partial element group from the plurality of elements contained in the structured document acquired by the acquisition unit; and a selection unit configured to select, in accordance with content of each of the plurality of elements included in the element group specified by the specification unit, an output-target element from the plurality of elements included in the element group.

According to a second aspect of the present invention, there is provided an information processing method of an information processing apparatus, comprising: acquiring a structured document containing a plurality of elements; specifying, in accordance with an instruction from a user, a partial element group from the plurality of elements contained in the structured document acquired at the acquiring step; and selecting, in accordance with content of each of the plurality of elements included in the element group specified at the specifying step, an output-target element from the plurality of elements included in the element group.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a diagram illustrating an example of the composition of a structured document;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that a "printing medium" means not only a paper sheet for use in a general printing apparatus but also a member which can fix ink, such as cloth, plastic film, metallic plate, glass, ceramics, resin, lumber, or leather in a broad sense.

Figure 1:
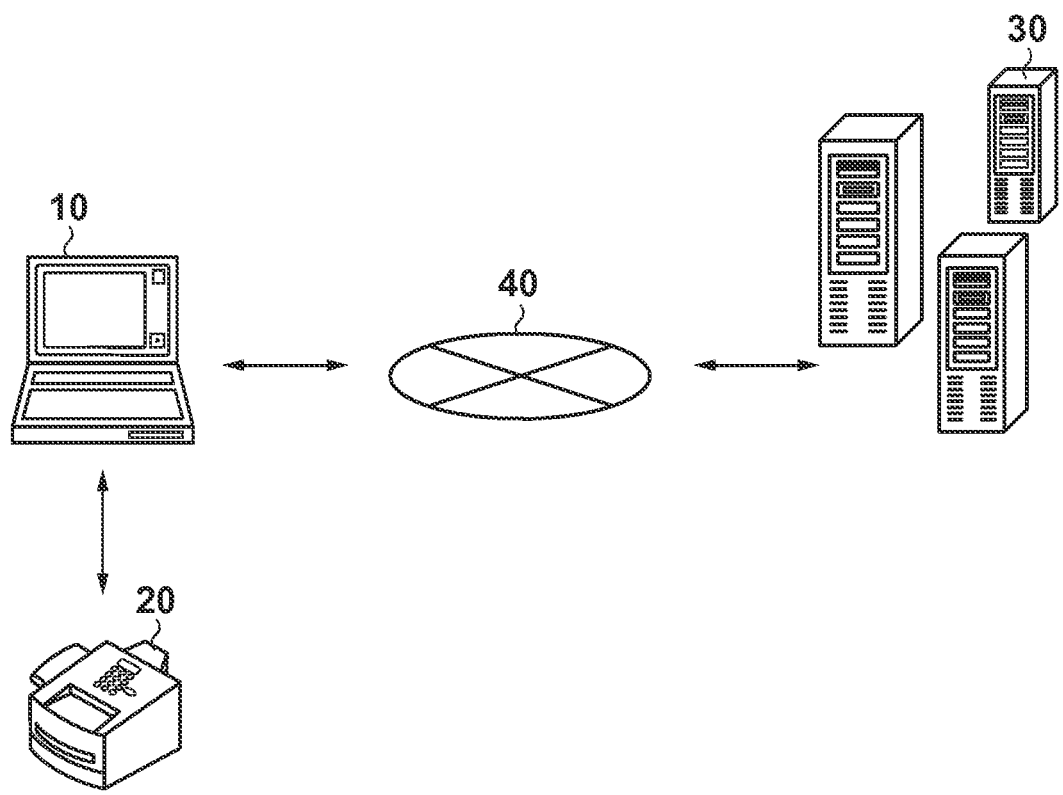
FIG. 1 is a diagram illustrating an example of the configuration of a printing system relating to an embodiment of the present invention.

FIG. 1 is a diagram illustrating an example of the configuration of a printing system relating to an embodiment of the present invention.

A personal computer 10, a printer 20 and a plurality of WWW servers 30 are connected to the printing system via Internet 40. The personal computer 10 and printer 20 are connected using a LAN (Local-Area Network) or USB (Universal Serial Bus) so as to be capable of communicating with each other. It should be noted that the overall configuration shown here is strictly one example. For instance, a plurality of personal computers 10 and a plurality of printers 20 may be provided, and other devices may be connected as well.

The personal computer 10 is an information processing apparatus operated by the user. The personal computer 10 downloads a Web page from WWW server 30 via the Internet 40 and displays the downloaded Web page. The Web page is constituted by a structured document described in HTML, XHTML or XML or the like. A structured document is a document described by structured description language (markup language, for example), which defines the structure of a document using elements of a plurality of types. As long as a display screen is created based upon this document, it does not matter if the document is other than a Web page. Further, after the personal computer 10 has downloaded the Web page from the WWW server 30, the personal computer 10 is capable of instructing the printer 20 to print this Web page.

The printer 20 is a printing apparatus for forming an image on a printing medium (paper, for example) and printing the image. It should be noted that the printing method used by the printer 20 is not particularly limited and may be an inj-ket method or electrophotographic method, by way of example.

The WWW server 30 stores Web pages and images and the like described in HTML or XHTML or the like and provides these items of information via the Internet 40 in response to a request from the personal computer 10 or the like.

Figure 2:
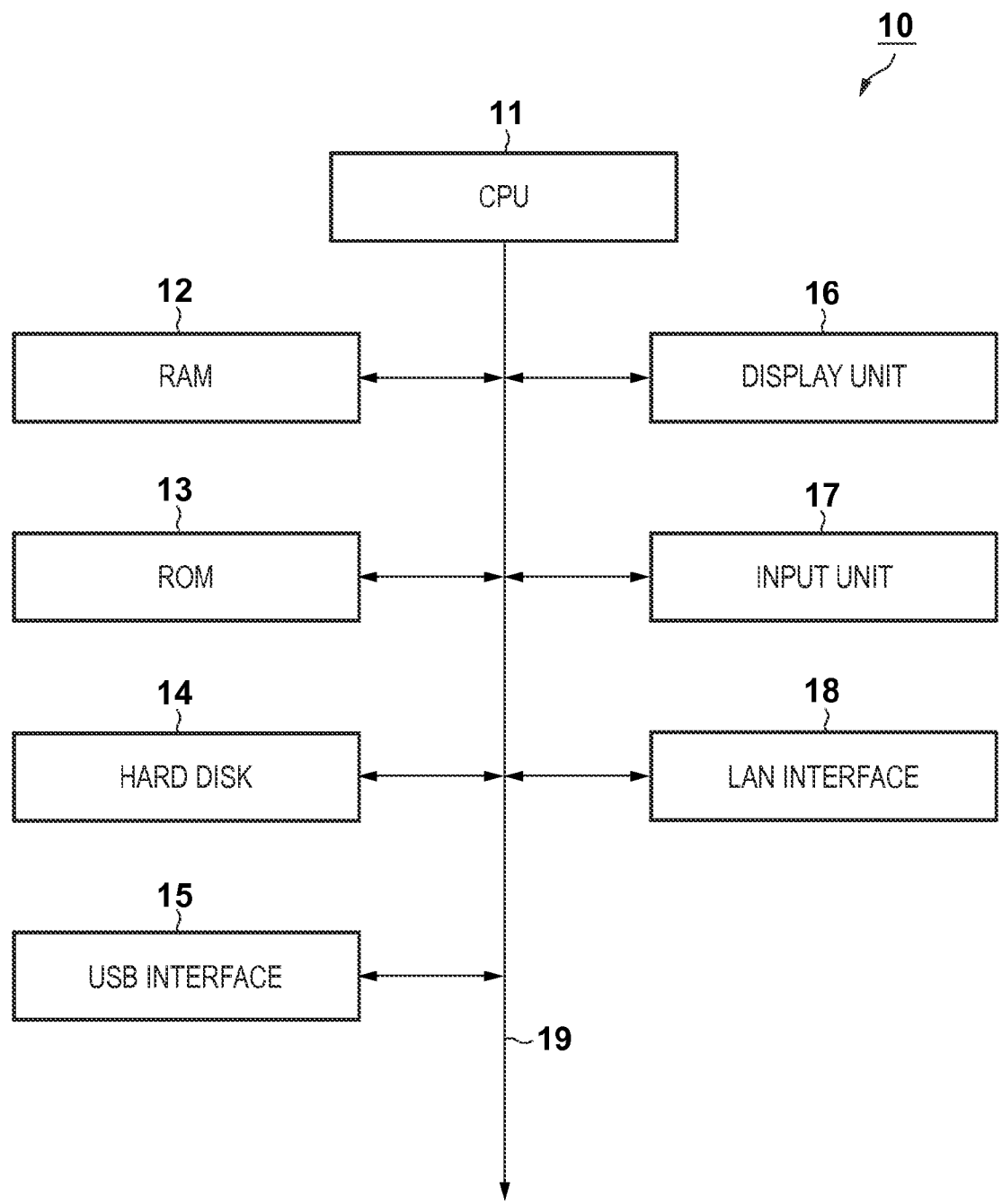
FIG. 2 is a diagram illustrating an example of the hardware configuration of a personal computer 10 shown in FIG. 1.

Next, an example of the hardware configure of the personal computer 10 shown in FIG. 1 will be described with reference to FIG. 2.

The personal computer 10 comprises a CPU 11, a RAM 12, a ROM 13, a hard disk 14, a USB interface 15, a display unit 16, an input unit 17 and a LAN interface 18. It should be noted that the various units constituting the personal computer 10 are connected via a bus 19 so as to be capable of communicating with one another.

The CPU 11 performs overall control of operation of the personal computer 10. More specifically, the CPU 11 operates on data and executes instructions in accordance with a program that has been stored in ROM 13 or on the hard disk 14, etc.

The RAM 12 is used as a work area when the CPU 11 executes various processing. The hard disk 14 stores an operating system (OS), browser and other application software and the like.

The USB interface 15, which is an interface to which a USB cable is connected, is used in order to perform data communication with the printer 20, by way of example. The LAN interface 18 is an interface to which a LAN cable is connected and is used in order to perform data communication with the WWW server 30 via the Internet 40, by way of example. It should be noted that data communication using the USB interface 15 and LAN interface 18 may be wired or wireless communication.

The display unit 16 is a CRT or liquid crystal display or the like and displays various screens [e.g., a Web page, print preview image, graphic user interface (GUI)] based upon information downloaded from the WWW server 30. The input unit 17 is constituted by a mouse and keyboard, for example, and inputs user instructions to the apparatus.

Figure 3:
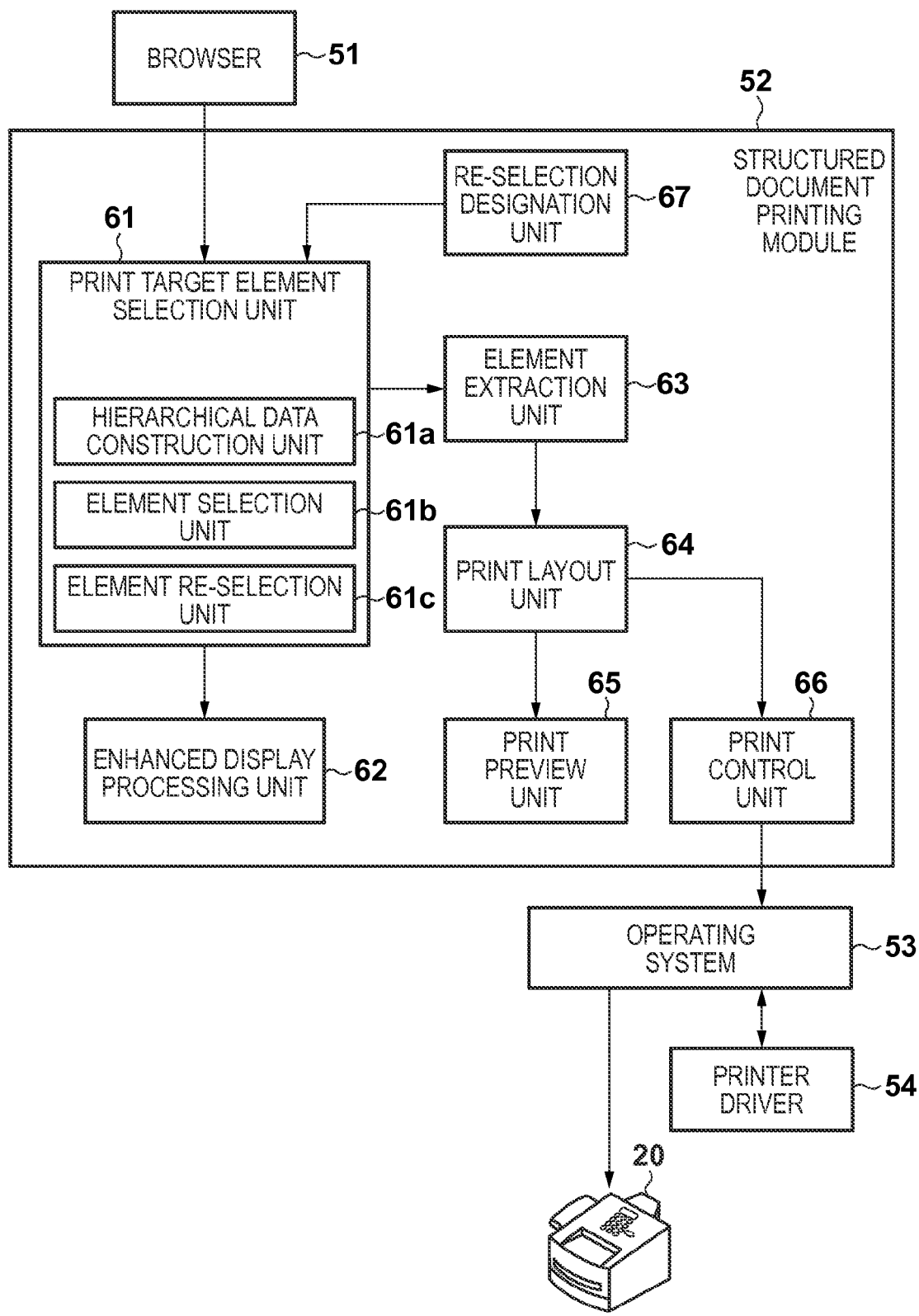
FIG. 3 is a diagram illustrating an example of a functional configuration implemented in the personal computer 10 shown in FIG. 1.

Next, an example of a functional configuration implemented by the personal computer 10 will be described with reference to FIG. 3. It should be noted that a functional configuration implemented within a structured document printing module 52 is realized by having the CPU 11 execute a program (the structured document printing module, for example) that has been read in from the ROM 13 using the RAM 12 as a work area, by way of example.

The browser 51, which is an application for displaying Web pages, functions to download a Web page from the WWW server 30 to the hard disk 14 of the personal computer 10 and to display the downloaded Web page on the display unit 16. As mentioned above, Web pages are structured documents of HTML or XHTML or the like and the elements that constitute a structured document, such as text and images, are described using tags. Further, a separate file referred to as a CSS (Cascading Style Sheet) that stipulates the display style of these elements is designated within a structured document. The browser 51 analyzes these structured documents and displays them on the display unit 16.

The structured document printing module 52 is plug-in software called from the browser 51. For example, if the browser 51 is instructed to perform automatic extraction of a print region (described later) in a state in which the user has not selected a print region, the structured document printing module 52 is activated. Further, in a case also where the browser 51 is again instructed to perform automatic extraction of a print region in a state in which a print region has been selected, the structured document printing module 52 is activated.

In the description that follows, a case will be described in which the structured document printing module 52 decides a Web-page region to be printed and causes the image of the decided region to be printed by the printer 20. However, the processing executed by the structured document printing module 52 is not limited to printing of images. The processing includes deciding a Web-page region to be output and displaying the decided region, and performing various control operations such as control of storage of such regions in memory and transfer of these regions to external devices.

Further, it may be arranged so that only elements automatically selected from among the plurality of elements contained in a structured document are output, and it may be arranged so that the user can output, in a form distinguishable from each other, both an automatically selected element and other elements.

It should be noted that in order for the user to specify automatic extraction of an output region in a state in which the output region has not been selected, the user uses a mouse or the like to specify the setting of an automatic extraction mode and specifies the start of automatic extraction. Further, in order for the user to specify automatic extraction of an output region in a state in which the output region has been selected, the user uses a mouse or the like to specify the desired output region within the Web page in a state in which the automatic extraction mode has been set.

The structured document printing module 52 comprises a print target element selection unit 61, an enhanced display processing unit 62, an element extraction unit 63, a print layout unit 64, a print preview unit 65 and a print control unit 66 as the functional components of the module.

The print target element selection unit 61, which functions to extract an element to be printed from within a structured document, comprises a hierarchical data construction unit 61a, an element selection unit 61b and an element re-selection unit 61c.

The hierarchical data construction unit 61a analyzes the elements within the structured document and constructs a DOM (Document Object Model) tree in the RAM 12. A DOM tree is data indicating the hierarchical structure of the elements constituting the structured document. An element that is a parent to a child element, or a child element corresponding to a parent element, which is contained in the structured document can be specified by acquiring the DOM tree. In other words, by using a DOM tree, a parent element that includes a region corresponding to a specific child element can be specified in a Web page.

The element selection unit 61b selects one element or a plurality of elements (referred to as "print-target elements" below) from a structured document using a DOM tree in a case where automatic extraction of an element has been designated by the user in a state in which a print region has not been selected. The element selection is performed by referring to the element content (area of each element, amount of text and text ratio, etc.). It should be noted that amount of text refers to the number of characters actually displayed on the browser and is included in character information within the element, by way of example. Text ratio refers to the ratio of overall tag size of an element to the amount of text, by way of example.

The element re-selection unit 61c re-selects one element or a plurality of elements from a structured document using a DOM tree in a case where automatic extraction of an element has been designated by the user in a state in which a print region has already been selected by the element selection unit 61b. In re-selection of a print-target element, an element located at coordinates in a Web page designated as by the clicking of a mouse by the user is selected as the print-target element. A DOM tree and the manner in which a print-target element is selected will be described in detail later.

The enhanced display processing unit 62 presents an enhanced display of a print-target element, which has been selected by the print target element selection unit 61, in the form of a print region on the browser 51. For example, an enhanced display is presented as by enclosing the print-target element in a semi-transparent rectangle. It should be noted that an enhanced display is presented in order to notify the user of an element selected as the print target or of the region corresponding to this element in the Web page. Accordingly, it will suffice so long as the user can be notified of the print-target element, and the method of accomplishing this is not limited to an enhanced-display method. For example, information indicating the element that has been selected, such as text included in the element or the file name of a file that has been inserted as an element, may be displayed. Further, the method of notification also is not limited to a display. The user may be notified by causing the printer to print information indicative of the file that has been selected, or the user may be notified as by voice.

The element extraction unit 63 extracts from the structured document the print-target element selected by the print target element selection unit 61. In accordance with print settings, the print layout unit 64 decides the layout of print-target elements, which have been extracted by the element extraction unit 63, on a printing medium (paper, for example). It should be noted that print settings include information such as paper size, resolution and printable regions. The print settings are acquired from a printer driver 54 via an operating system 53. The print preview unit 65 arranges print-target elements in accordance with the layout decided by the print layout unit 64 and displays the elements on the display unit 16 as a print preview.

In accordance with the arrangement information indicating the output of the print-target elements selected by the print layout unit 64, the print control unit 66 controls printing that is based upon these print-target elements. More specifically, the print control unit 66 causes the printer driver 54 to execute processing for rendering the print-target elements via the operating system 53.

A re-selection designation unit 67 accepts designation of re-selection of a print region specified by the user via the input unit 17. This designation is input by the user after the print-target element selected by the element selection unit 61b is displayed in enhanced form.

The operating system 53 provides various APIs (Application Programming Interfaces). For example, the operating system 53 provides an API for the purpose of allowing the structured document printing module 52 and printer driver 54 to exchange print settings data, or an API for rendering processing. Although the operating system 53 includes various control software such as a spooler system for managing a print job and a port monitor for outputting a printer command to a port, these techniques are well known and need not be described in detail here.

The printer driver 54 executes rendering processing in accordance with control by the print control unit 66, creates print data and converts the print data to a printer command. The printer driver 54 then transmits the printer command to the printer 20 via the operating system 53. As a result, the printer 20 can be made to print an image on the printing medium (paper, for example).

Figure 4:
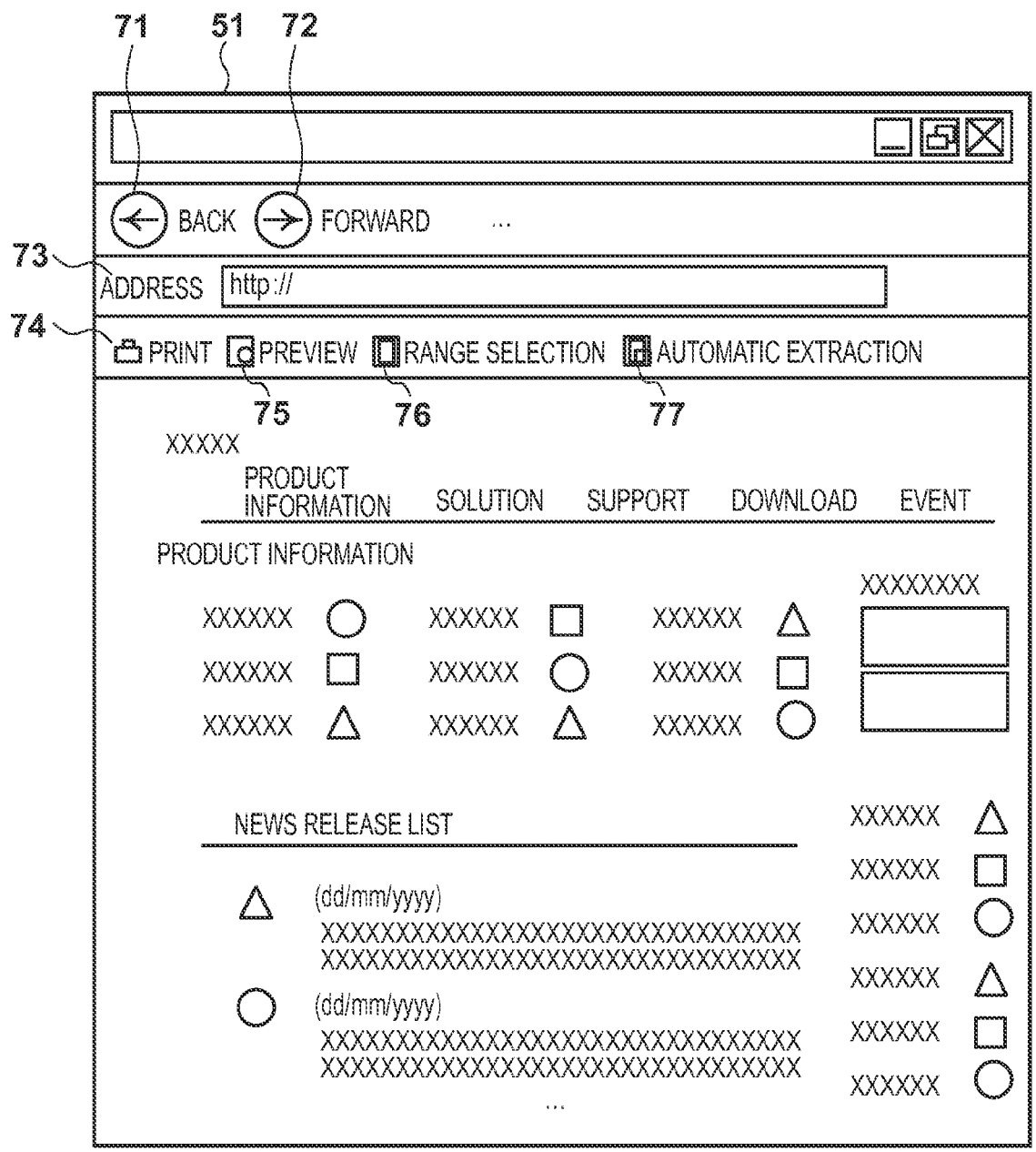
FIG. 4 is a diagram illustrating an example of a GUI screen displayed on a display unit 16.
Figure 5:
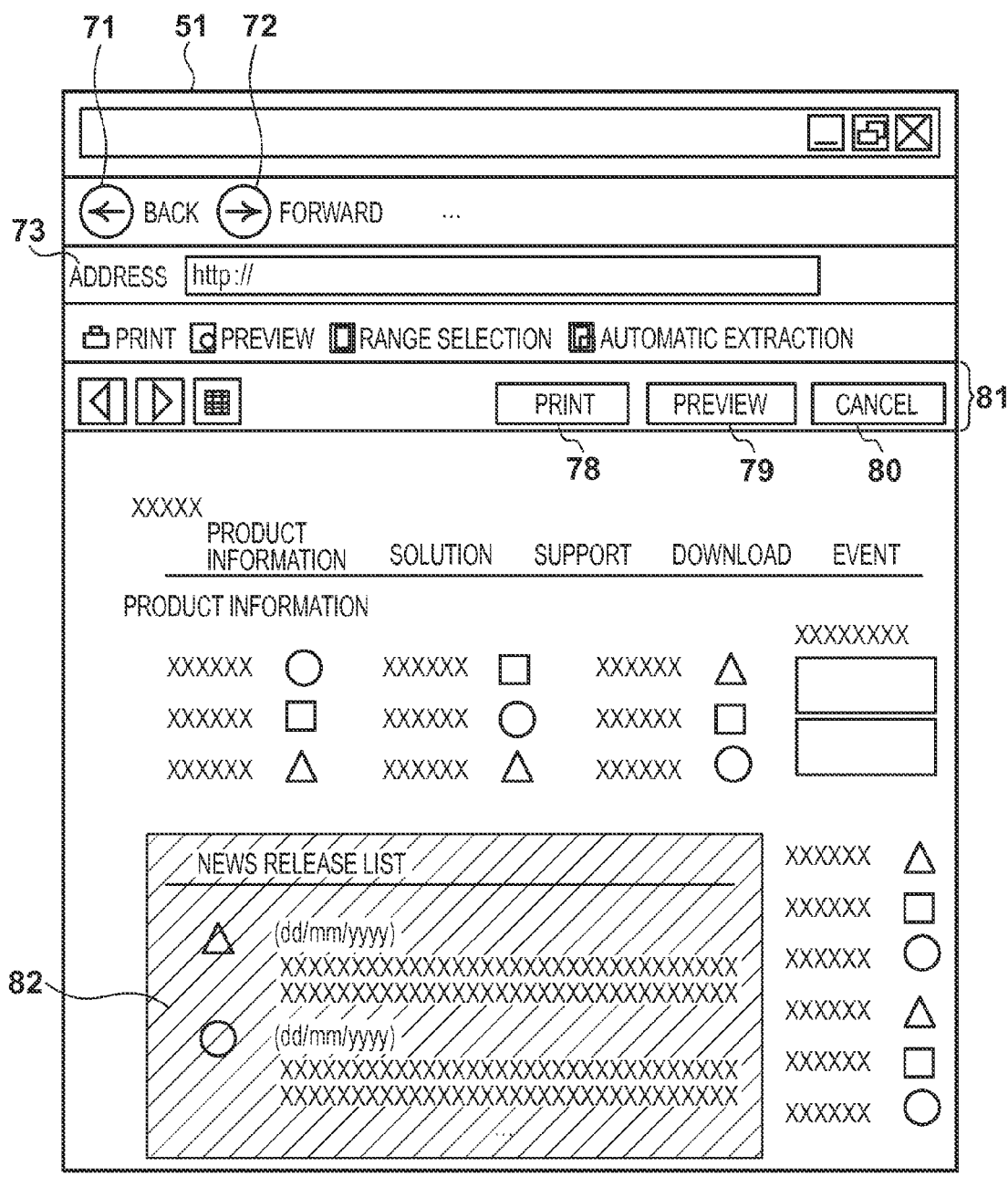
FIG. 5 is a diagram illustrating an example of a GUI screen displayed on a display unit 16.
Figure 6:
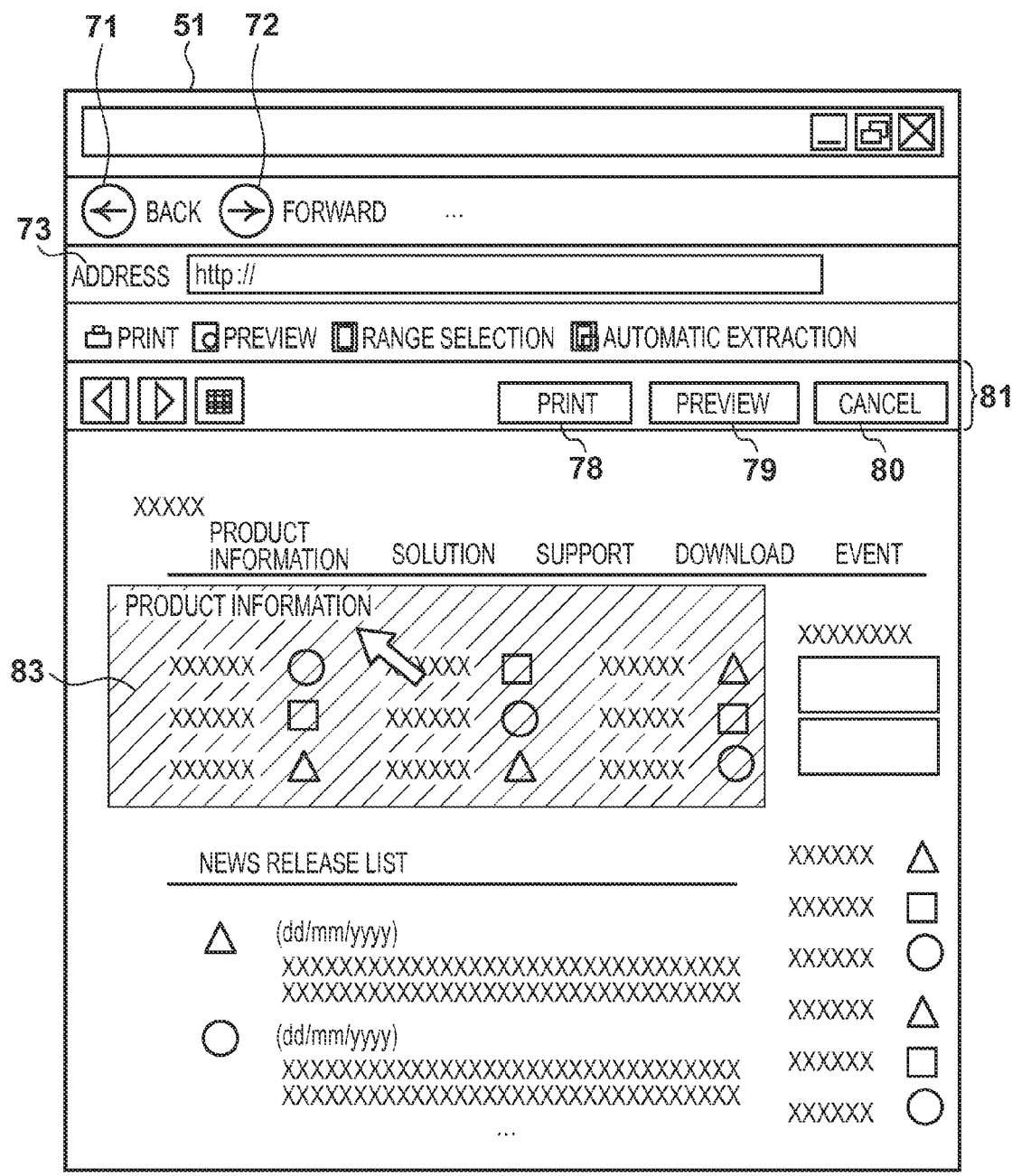
FIG. 6 is a diagram illustrating an example of a GUI screen displayed on a display unit 16.

Next, reference will be had to FIGS. 4 to 6 to describe an example of GUI screens displayed on the display unit 16. It should be noted that FIGS. 4 to 6 illustrate an example in a case where a structured document (Web page) is displayed on the browser 51.

The browser 51 is provided with a back button 71, a forward button 72 and an address input area 73, etc., as illustrated in FIG. 4. The browser 51 is further provided with a print button 74, a print preview button 75, a range selection button 76 and an automatic extraction button 77.

If the automatic extraction button 77 is clicked by a user operation performed via a mouse or the like, the structured document printing module 52 is activated and a print region (print-target element) is selected automatically.

When the structured document printing module 52 is activated, a plug-in area 81 is displayed on the browser 51, as illustrated in FIG. 5. Disposed in the plug-in area 81 are a print button 78 for specifying start of printing, a print preview button 79 for specifying display of print preview, and a cancel button 80. If the cancel button 80 is clicked, the display screen shown in FIG. 4 is restored.

Here the structured document printing module 52 specifies a print-target element from the structured document that describes the composition of the Web page. Further, the structured document printing module 52 selects the specified print-target element as a print region and presents an enhanced display of this print-target element on the browser 51. In this case, a region 82 is displayed in enhanced form as the print region. It will suffice if the enhanced display is presented as by changing the settings in the style sheet, by way of example. In the example shown in FIG. 5, the region 82 is displayed in enhanced form using a semi-transparent rectangle. However, this is only one example. For instance, an enhanced display may be presented as by changing the background color or displaying only a border around the region.

If the print region desired by the user and the region 82 displayed in enhanced form match, the user clicks the automatic extraction button 77 again using the mouse or the like in order to finalize the print region.

On the other hand, if the print region desired by the user and the region 82 displayed in enhanced form do not match, then the user clicks the desired print region on the Web page using the mouse or the like, as illustrated in FIG. 6. When this is done, the browser 51 again calls the structured document printing module 52 using, as parameters, the structured document corresponding to the Web page being displayed and coordinate information of Web page coordinates indicating the position clicked by the user on the Web page. It should be noted that although this embodiment is described taking as an example a case where the structured document printing module 52 is called again in response to a user instruction, an arrangement may be adopted in which the above-mentioned coordinate information is input directly to the structured document printing module 52 in response to a user instruction.

The structured document printing module 52 that has been called again now specifies the element that contains the clicked position from the structured document. The structured document printing module 52 thenceforth selects the specified print-target element as the print region, obtains the display region of the print-target element on the browser 51 and displays this region in enhanced form. In this case, a region 83 is being displayed in enhanced form as the print region.

As a result, if the print region desired by the user and the region 83 displayed in enhanced form match, then the user clicks the automatic extraction button 77 using the mouse or the like in order to finalize the print region. It should be noted that if the desired print region and the region 83 displayed in enhanced form differ even under these conditions, then the user again clicks the desired print region on the Web page (on the display screen) using the mouse or the like.

FIG. 7 illustrates an example of the composition of a structured document. The structured document shown in FIG. 7 is described in the XHTML format. Although not illustrated, the layout information of each element in the structured document generally is described using a style sheet.

Figure 8:
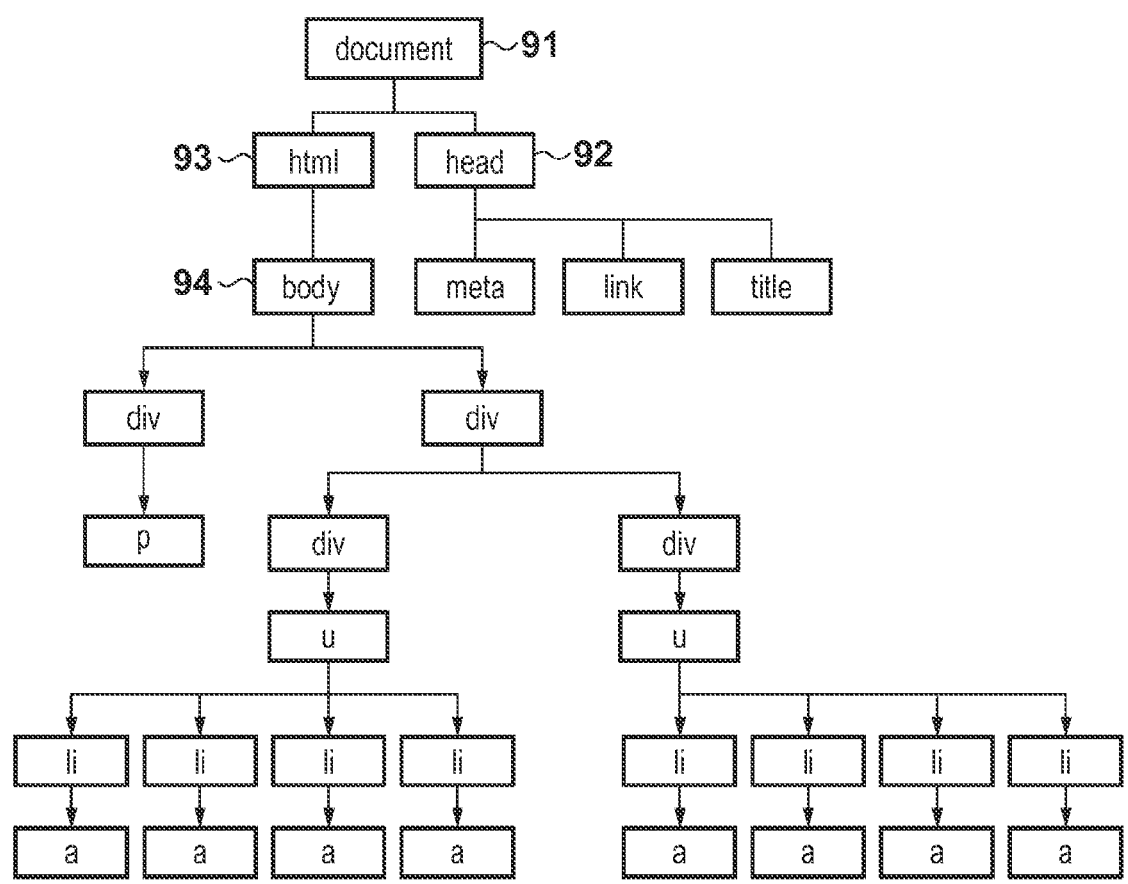
FIG. 8 is a diagram illustrating an example of the data structure of hierarchical elements.

FIG. 8 illustrates an example of the data structure of hierarchical elements referred to as a DOM tree. It should be noted that FIG. 8 illustrates a DOM tree constructed by the print target element selection unit 61 based upon the structured document shown in FIG. 7.

The DOM tree constructed based upon the structured document shown in FIG. 7 has a document node 91, which represents the overall document, as a root node. The DOM tree has a node 92 of a head element and a node 93 of an html element as the child nodes of the root node. The node 93 of the html element further has a node 94 of a body element as a child node.

Thus, each element node holds data such as a pointer to a parent element node, a pointer to a sibling element node, a pointer to a child element node list, attribute information and text information. The form of display of each element and the layout information are defined by the style sheet, and these items are stored in the RAM 12 or the like as the node information of each element of the DOM tree. For example, font type, font size, character color and display position, etc., correspond to the node information of each element.

Figure 9:
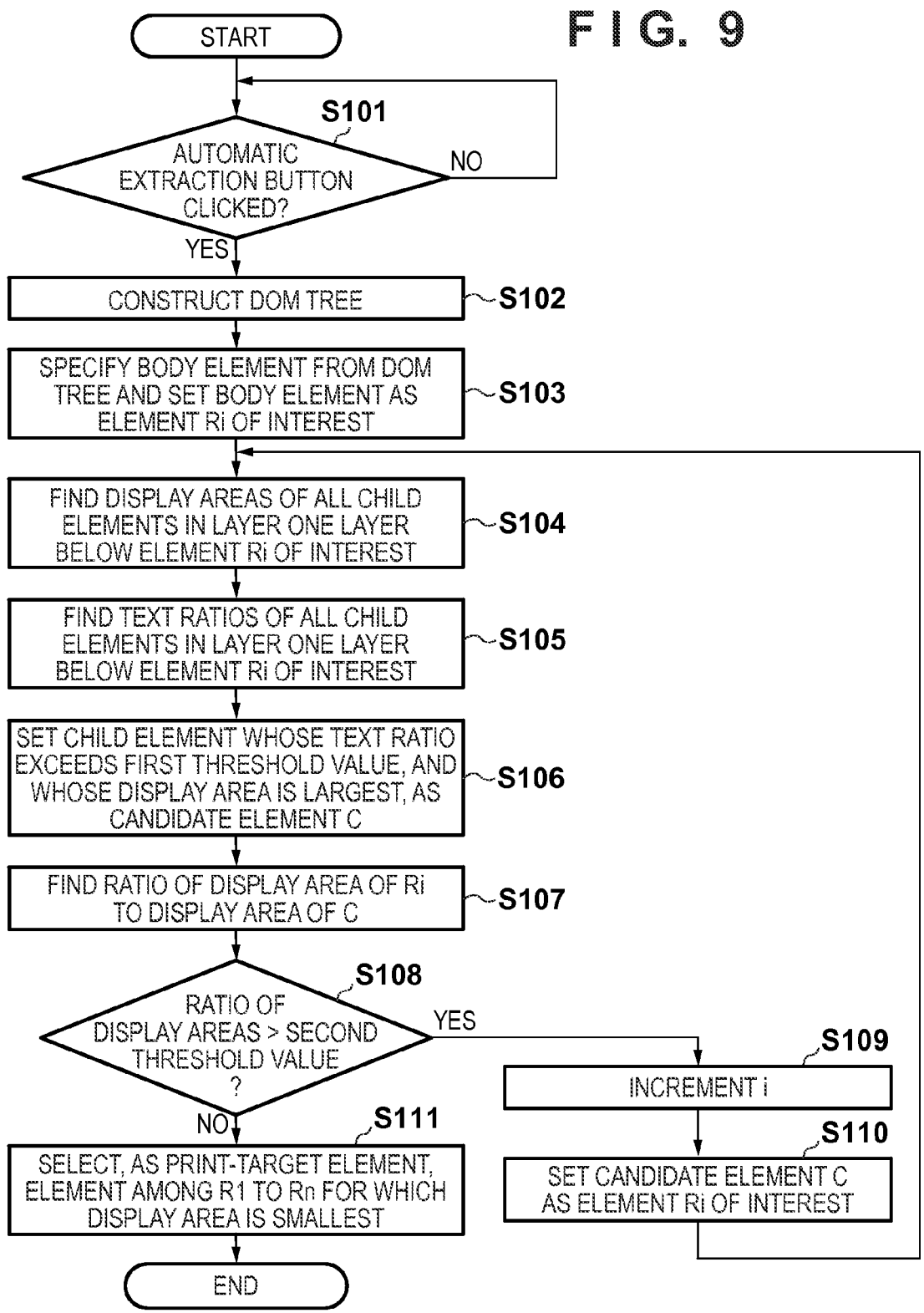
FIG. 9 is a flowchart illustrating an example of the flow of processing in the personal computer 10 shown in FIG. 1.
Figure 10:
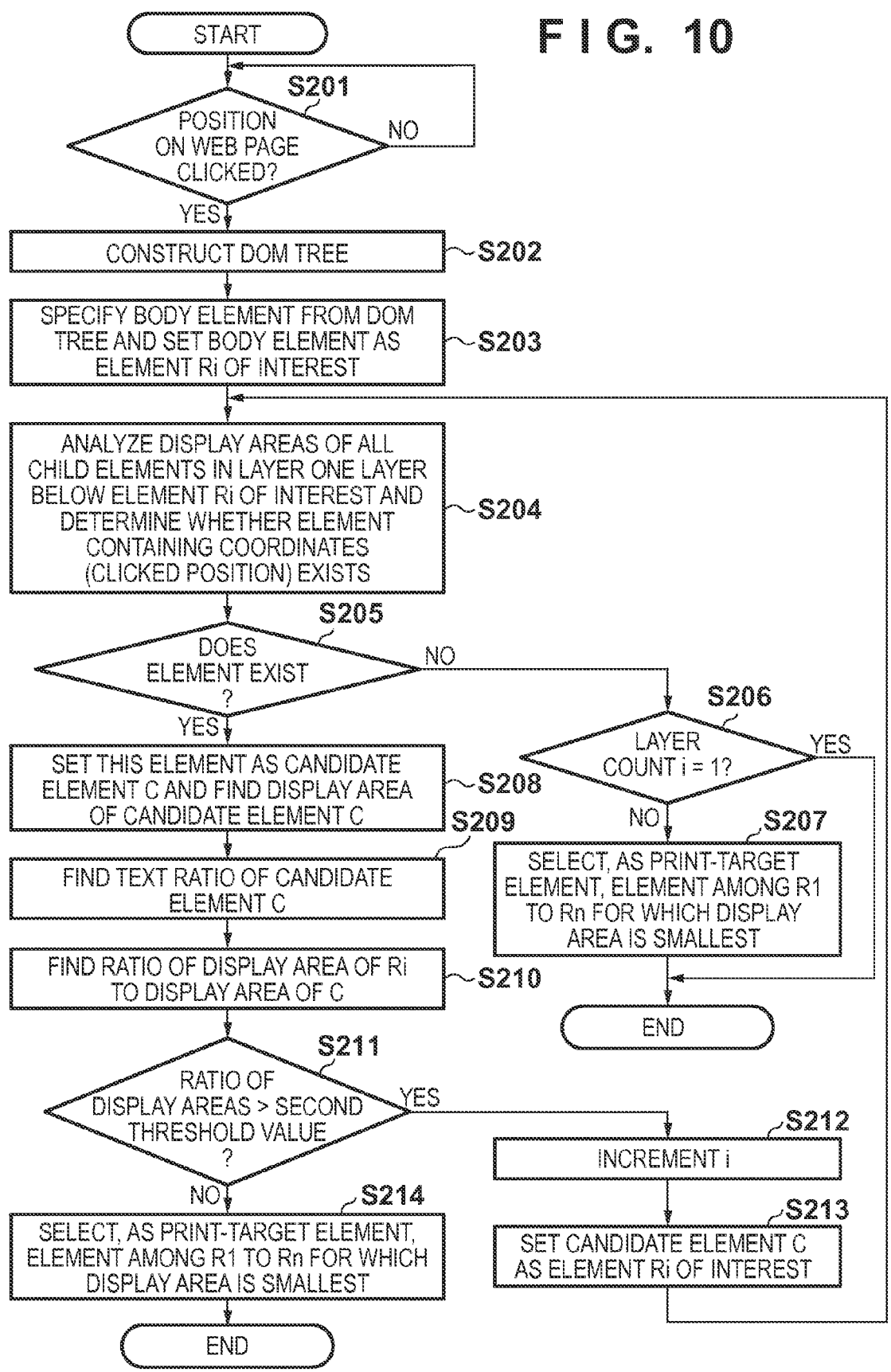
FIG. 10 is a flowchart illustrating an example of the flow of processing in the personal computer 10 shown in FIG. 1.

Next, an example of the flow of processing in the personal computer 10 shown in FIG. 1 will be described with reference to FIGS. 9 and 10. It should be noted that the processing shown in FIGS. 9 and 10 is implemented by having the CPU 11 execute a program corresponding to each functional component within the structured document printing module 52 shown in FIG. 3.

First, the flow of processing for selecting a print-target region will be described with reference to FIG. 9 in a case where automatic extraction has been specified in a state in which a print region has not been selected.

This processing starts ("YES" at step S101) when the automatic extraction button 77 on the browser 51 shown in FIG. 4 is clicked by the user using a mouse or the like. When the processing starts, the personal computer 10 activates the structured document printing module 52 with the structured document of the Web page being displayed on the browser 51 serving as a parameter.

Using the hierarchical data construction unit 61a, the structured document printing module 52 reads out the structured document via the browser 51 and constructs the DOM tree in the RAM 12 (step S102). Each element of the DOM tree possesses node information, as described above.

When construction of the DOM tree is completed, the structured document printing module 52 uses the element selection unit 61b to specify the body element 94 from within this DOM tree and adopts the body element 94 as an element Ri of interest (where i represents a natural number, the initial value of which is 1) (step S103). It should be noted that the initial value of Ri is R1. Further, the natural number i represents the number of layers below the body element 94 of the DOM tree; the higher the value of i, the lower the layer represented in the structured document.

The print target element selection unit 61 executes subsequent processing (steps S104 to S110) repeatedly and specifies, layer by layer, an element of interest in a layer underlying a higher-order layer of the DOM tree. More specifically, first the element selection unit 61b acquires the widths and heights (in pixel units) of all child elements, which are immediately below (one layer below) the element Ri of interest, in the display region, and finds the display areas of all of the child elements immediately below the element Ri of interest based upon these items of information (step S104). It should be noted that the display area of each child element need only be found using information described in the tag and information specified in the style sheet, by way of example.

Next, the element selection unit 61b acquires the text amounts and XHTML tag sizes included in all of the child elements immediately below (one layer below) the element Ri of interest and finds the text ratios in all of these elements based upon these items of information (step S105).

From among all of the child elements immediately below the element Ri of interest, the print target element selection unit 61 specifies a child element whose text ratio exceeds a first threshold value and whose display area is largest. The print target element selection unit 61 sets this specified element as a candidate element C (step S106).

Next, the element selection unit 61b compares the display area of the element Ri of interest with that of the candidate element C and finds the ratio of the display area of the candidate element C to the display area of the element Ri of interest (step S107). If the result of the comparison is that the ratio of the display areas exceeds a second threshold value ("YES" at step S108), the element selection unit 61b increments the layer number i (step S109) and then sets the candidate element C as the element Ri of interest (step S110). The personal computer 10 then returns control to the processing of step S104 and repeats the above-described processing.

It should be noted that if the above-mentioned ratio of the areas exceeds a predetermined threshold value, this means that the area of the region corresponding to the child element (candidate element C) within the region corresponding to Ri, which is the parent element, on the Web page is sufficiently large. In this case, there is a possibility that an element more suitable as an element to be output is contained in the child element C. For this reason, the processing of steps S104 to S107 is repeated with respect to child elements contained in the element C and an element that will serve as a candidate for output is extracted.

By thus executing the processing of steps S104 to S107 with respect to each layer of the structured document, elements R1 to Rn can be specified as candidates for output corresponding to the respective layers.

If the ratio of the display areas does not exceed the second threshold value ("NO" at step S108), on the other hand, the element selection unit 61b selects, as the print-target element, the element among the elements R1 to Rn for which the display area is smallest (step S111) and then terminates this processing. A child element included immediately below a parent element is adopted as the next candidate element, as described above. The portion of the region of the Web page corresponding to the parent element Ri becomes the region corresponding to child element R(i+1) on the Web page. In the processing of steps S104 to S110, therefore, the lower the order of the layer of interest, the smaller the area corresponding to the element of interest on the Web page. Accordingly, Rn is selected as the print-target element. Further, after the processing at step S111, this selected print-target element is displayed in enhanced form as a print region, as shown in FIG. 5.

It should be noted that this embodiment has been described taking as an example a case where the element of interest among the elements R1 to Rn of interest that has the smallest area is selected as the candidate for output. However, this does not impose a limitation upon the present invention. A candidate for output may be selected in accordance with various conditions such as the text amount.

Described next with reference to FIG. 10 will be the flow of processing for selecting (re-selecting) a print-target region in a case where automatic extraction has been specified again in a state in which a print region has been selected.

It should be noted that this processing is started when any position on a Web page is clicked ("YES" at step S201) on the browser 51 of FIG. 4 by the user using a mouse or the like. When this processing starts, the CPU 11 of personal computer 10 activates the structured document printing module 52 using as parameters the structured document of the Web page being displayed on the browser 51 and the Web-page coordinate information indicating the position clicked in the Web page.

Using the hierarchical data construction unit 61a, the structured document printing module 52 reads out the structured document via the browser 51 and constructs a DOM tree in the RAM 12 (step S202). The structured document printing module 52 then uses the element selection unit 61b to specify the body element 94 from within this DOM tree and adopts the body element 94 as an element Ri of interest (where i represents a natural number, the initial value of which is 1) (step S203). It should be noted that the initial value of Ri is R1.

The print target element selection unit 61 executes subsequent processing (steps S204 to S213) repeatedly and specifies, layer by layer, an element of interest in a layer underlying a higher-order layer of the DOM tree. More specifically, first the element re-selection unit 61c refers to all child elements, which are immediately below (one layer below) the element Ri of interest, in accordance with coordinate information that was input when the structured document printing module 52 was activated. The element re-selection unit 61c then determines whether these child elements include an element that has been placed at a position (designated coordinates) clicked by the user on the Web page (step S204). That is, the element re-selection unit 61c finds the coordinates of the display region on the Web page to which each of the child elements corresponds and compares the coordinates of this display region and the coordinates of the clicked position, thereby determining the element. It should be noted that the coordinates of the position on the Web page designated by the user are input to the structured document printing module 52 by the re-selection designation unit 67.

If the result of the determination is that the relevant element exists ("YES" at step S205), the element re-selection unit 61c sets this element as the candidate element C. The element re-selection unit 61c then acquires the width and height (in pixel units) of the candidate element C in the display region and finds the display area of the candidate element C based upon these items of information (step S208). The element re-selection unit 61c then acquires the text amount contained in the candidate element C and the XHTML tag size and finds the text ratio based upon these items of information (step S209).

Next, the element re-selection unit 61c compares the display area of the element Ri of interest with that of the candidate element C and finds the ratio of the display area of the candidate element C to the display area of the element Ri of interest (step S210). If the result of the comparison is that the ratio of the display areas exceeds a second threshold value ("YES" at step S211), the element re-selection unit 61c increments the layer number i (step S212) and then sets the candidate element C as the element Ri of interest (step S213). The personal computer 10 then returns control to the processing of step S204 and repeats the above-described processing.

If the ratio of the display areas does not exceed the second threshold value ("NO" at step S211), on the other hand, the element re-selection unit 61c selects as the print-target element the element among the elements R1 to Rn for which the display area is smallest (step S214) and then terminates this processing. A child element included immediately below a parent element is adopted as the next candidate element, as described above. The portion of the region of the Web page corresponding to the parent element Ri becomes the region corresponding to child element R(i+1) on the Web page. In the processing of steps S204 to S213, therefore, the lower the order of the layer of interest, the smaller the area corresponding to the element of interest on the Web page. Accordingly, the element Rn is selected at step S214 as the element to be output in this case. However, instead of adopting the element Rn as the element to be output, the element C specified at step S208 may be adopted as the element to be output. In such case the element C corresponds to a region that contains the coordinates designated by the user on the Web page and is an element in the layer which is one layer below the element Rn. That is, element C having an area smaller than that of the element Rn can be adopted as the element to be output.

Further, after the processing of step S214, the print-target element selected is displayed in enhanced form as the print region. When this is done, the user, who observes the enhanced-display region as the print region, can verify whether this print region is the one desired. If the region of the print-target element decided at step S214 is not the desired print region, a change of the print region can be specified by using a user-operated device such as a mouse. At this time the elements R1 to Rn that include the coordinates designated on the Web page by the use will have been specified, as described above. Accordingly, the elements R1 to Rn are displayed in enhanced form as print-region candidates in accordance with an instruction from the user and these are presented to the user. When the desired print region has been displayed in enhanced form, the user can cause the image of the desired print region to be printed by clicking the print button 78 or print preview button 79 shown in FIG. 5. That is, the user can select the desired print region from among multiple candidates of print regions that contain the coordinates designated on the Web page.

If the result of the determination at step S205 is that the relevant child element does not exist ("NO" at step S205), the element re-selection unit 61c determines whether layer count i=1 holds. If i=1 holds ("YES" at step S206), this processing is terminated without a new print-target element being selected. That is, since an element corresponding to the Web-page region designated by the user does not exist in the highest-order layer (i=1) of the structured document, this processing is terminated.

If i=1 does not hold ("NO" at step S206), then control proceeds to the processing of step S207. In this case, as a result of advancing the layer of the structured document toward lower-order layers and narrowing down the region of the Web page, the region in the Web page that will correspond to the element Rn of interest of the applicable layer (i=n) will not correspond to the coordinates designated on the Web page by the user. That is, it will be understood that although the elements R1 to Rn that were adopted as the elements of interest up to this point in time contain the Web-page coordinates designated by the user, a child element in the layer that is one layer below Rn does not contain the coordinates. In other words, the elements R1 to Rn are specified as elements that contain the coordinates designated on the Web page by the user. It should be noted that although the element Rn having the smallest area is selected from among the above-mentioned elements R1 to Rn, there are instances where an element that is smaller than the element desired for output by the user will be selected. In particular, in a case where the user designates coordinates on a Web page by using a pointing device, there are instances where, even though the user desires the surrounding region of these coordinates as the output target, the element Rn that includes these coordinates is a zone that is smaller than the surrounding region expected by the user. In this embodiment, therefore, from among the elements R1 to Rn, an element in a layer higher than Rn is decided upon as the element to be output. In the example of FIG. 10, R(n−1), which is an element in the layer that is one higher than that of Rn, is adopted as the element to be output. However, an element in a layer that is two or more layers higher than that of Rn may just as well be decided as the element to be output.

The element re-selection unit 61c selects as the print-target element the element R(n−1) having the smallest display area among the elements of interest R1 to R(n−1) of area larger than that of element Rn (step S207) and then terminates this processing. The element R(n−1) is selected as the print-target element since the lower the layer, the smaller the area in the Web page, as mentioned earlier. Further, following the processing of step S207, the print-target element that has been selected is displayed in enhanced form as the print region, as shown in FIG. 6. It should be noted that the desired element among the elements R1 to Rn can be selected as the element to be output.

Thus, in accordance with this embodiment, as described above, a DOM tree in which the elements of a structured document have been arranged in hierarchical form is analyzed layer by layer, an element that is to be output is selected based upon the result of this analysis, and a Web-page region that corresponds to this element is displayed on the display unit 16 in enhanced form. If a region desired for output by the user and the selected element do not match, the user can specify re-selection of the output-target element by designating the position (coordinates) of the desired element on the Web page.

By executing the processing of steps S204 and S205 in accordance with the flowchart of FIG. 10 in the manner described above, an element of an order higher than that of an applicable element that includes an element designated by the user can be decided upon as the element Ri of interest from among the elements contained in a DOM tree. That is, a group of elements are specified by specifying an element that includes an element decided by the user. By executing the processing of step S206 and S207, an element in a layer higher than that of an element decided by the user, or an element decided by a specification made by the user, is selected as the element to be output. Accordingly, an element decided by a specification made by the user is included as an element to be output.

As a result, the user can automatically select a region to be output from a Web page and, in a case where the selected region is one not acceptable to the user, automatic selection of the desired region can be specified again through a simple operation.

It should be noted that in the description rendered above, elements of an order higher than that of an element decided by user specification are specified as an element group. However, this does not impose a limitation upon the present invention. An element group may be specified so as to include elements in the same layer or in a lower-order layer of an element decided by user specification. That is, an element group that includes an element decided by user specification is specified and it will suffice if, as a result, an element decided by user specification is included in the element to be output.

The foregoing is one example of a typical embodiment of the present invention. However, the present invention is not limited to the embodiment indicated in the foregoing description and drawings and can be suitably modified within the scope of the claims.

For example, the flow of processing described in FIGS. 9 and 10 above is only one example and may be implemented upon being modified as necessary. For example, in the description of FIG. 9, although the selection of a print-target element is performed using the area of an element (display area) and text ratio, the selection of the print-target element may be performed based upon text ratio only.

Further, in the description rendered above, Web-page coordinates designated by the user are specified and element selection is performed so as to include an element corresponding to the specified coordinates. However, the invention is not limited to a case where coordinates are specified; it will suffice if an element corresponding to a Web-page region designated by the user can be decided.

Furthermore, an arrangement may be adopted in which a print-target element is selected using information other than element area and element text ratio. For example, an element may be selected using element tag type, tag attribute or style, etc.

Further, in the description rendered above, a DOM tree is created and analysis of each element is performed using this DOM tree. However, this does not impose a limitation upon the present invention. For example, it may be arranged so that all elements are acquired from a structured document without creating a DOM tree and all of the acquired elements are analyzed to thereby extract the element of interest.

Further, in the description rendered above, the embodiment is described taking as an example a case where once automatic selection of an element to be output has been made, automatic selection is performed again in response to designation of a position on a Web page by the user. However, a case where automatic selection is performed again does not constitute a restriction and it may be arranged so that in a case where a position on a Web page is designated by the user in a state in which an element to be output has not been selected, automatic selection is carried out in accordance with the designated position.

Further, in the description rendered above, whether a text element is adopted as a center element is determined based upon the number of characters of text, which are contained in the text element, displayed on the display unit. However, this does not impose a limitation upon the present invention. It may be arranged so that whether a text element is adopted as a center element is determined based upon the amount of data that has been allocated to the text contained in the text element. For example, on the basis of the number of bytes that have been allocated to the characters contained in text, a text element that contains text having a larger number of bytes may be determined as the center element. In general, there are characters for which two bytes are allocated to the character and characters for which one byte is allocated to the character.

Accordingly, if the determination is made in accordance with the number of bytes of text, text containing many characters to which two bytes have been allocated can be determined as text closer to the center of the Web page even if the number of characters is the same.

Further, in the description rendered above, a region to be output from within a Web page is selected by plug-in software associated with a browser that displays the Web page. However, this does not impose a limitation upon the present invention. An arrangement may be adopted in which the above-described functions are incorporated in the browser and the browser itself selects the region to be output from within the Web page.

Further, in the description rendered above, the embodiment is described taking HTML or XHTML as the language of the structured document. However, the processing according to the embodiment is applicable also to various structured documents in languages such as XML.

Thus, in accordance with the present invention, as described above, a user can readily select a desired region to be output from within a Web page.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-232784, filed on Oct. 15, 2010, which is hereby incorporated by reference herein in its entirety.

What is claimed is:

1. An information processing apparatus comprising:
a specification unit configured to specify from a plurality of elements which are contained in a structured document and which correspond to areas in an image based on the structured document, a first element corresponding to a first area and a second element corresponding to a second area, so that each of the first area and the second area includes a position in an area designated by a user in the image, and in a layer structure of the structured document, the second element is included in a higher-order layer than a layer including the first element;
a comparison unit configured to compare a size of the first area and a size of the second area with each other; and
a selection unit configured to select an output-target element from the first element and the second element specified by said specification unit, based on a comparison result by the comparison unit;
wherein at least one processor functions as at least one of said specification unit, said comparison unit, and said selection unit.

2. The apparatus according to claim 1, further comprising a notification unit configured to notify the user of the output-target element selected by said selection unit;
wherein said specification unit specifies other elements different from the first element and the second element in accordance with an instruction from the user that is based upon a notification given by said notification unit; and
said selection unit selects another output-target element from the other elements.

3. The apparatus according to claim 2, wherein said notification unit causes a display apparatus to display an area corresponding to the output-target element selected by said selection unit, from a Web page displayed on the display apparatus, based upon the structured document.

4. The apparatus according to claim 1, further comprising an output unit configured to output the output-target element selected by said selection unit, in a form distinguishing the output-target element from other element among the first element and the second element.

5. The apparatus according to claim 4, wherein said output unit outputs only the output-target element selected by said selection unit from among the plurality of elements included in the structured document.

6. The apparatus according to claim 4, wherein said output unit outputs, in a form distinguishable from each other, both the output-target element selected by said selection unit and the other element among the first element and the second element.

7. The apparatus according to claim 6, wherein said output unit outputs the output-target element selected by said selection unit distinctively from the other element among the first element and the second element and another element which is not included in the first element and the second element and is included in the plurality of elements.

8. The apparatus according to claim 4, wherein said output unit outputs the output-target element, which is selected by said selection unit, to a printing apparatus and causes an image corresponding to this the output-target element to be printed.

9. The apparatus according to claim 4, wherein said output unit cause a display apparatus to display both the output-target element selected by said selection unit and the other element, among the first element and the second element, in a form distinguishable from each other.

10. The apparatus according to claim 4,
wherein before said specification unit specifies the first element and the second element, said selection unit selects a predetermined element from the plurality of elements contained in the structured document, and said output unit outputs the predetermined element selected by said selection unit in a form distinguishing from other elements in the plurality of elements;
wherein said specification unit specifies the first element and the second element in accordance with a position designated by the user after the predetermined element was output by said output unit, and said selection unit then selects the output-target element from the first element and the second element.

11. The apparatus according to claim 1, wherein said selection unit selects the output-target element from the first element and the second element on the basis of the sizes of the first area and the second area on the image based upon the structured document, and content of text contained in each element.

12. The apparatus according to claim 1, wherein the image based on the structured document is a Web page which can be displayed by a Web browser, and each of the first area and the second area is an area on the Web page.

13. The apparatus according to claim 1, wherein the plurality of elements are included in a single structured document.

14. The apparatus according to claim 1, wherein said comparison unit acquires a ratio of the size of the first area to the size of the second area, and said selection unit selects the output-target element so that the second element is selected in a case where the ratio acquired by said comparison unit is equal to or smaller than a predetermined ratio and so that the first element is selected in a case where the ratio is larger than the predetermined ratio.

15. The apparatus according to claim 1, wherein the first area and the second area include a same part on the image including the position designated by the user.

16. The apparatus according to claim 1, wherein the second area is larger than the first area.

17. An information processing method executed in an information processing apparatus, comprising:
    specifying, from a plurality of elements which are contained in a structured document and correspond to areas in an image based on the structured document, a first element corresponding to a first area and a second element corresponding to a second area, so that each of the first area and the second area includes a position in an area designated by a user in the image, and in a layer structure of the structured document, the second element is included in a higher-order layer than a layer including the first element;
    comparing a size of the first area and a size of the second area with each other; and
    selecting an output-target element from the first element and the second element specified in said specifying step, based on a comparison result by the comparing step.

18. A non-transitory computer-readable storage medium storing a program for causing a computer to execute the information processing method set forth in claim 17.

19. The storage medium according to claim 18, the program is a plug-in software for a web browser which can cause a display apparatus to display a web page based on the structured document.

20. The method according to claim 17, further comprising
    a notifying step of notifying the user of the output-target element selected by said selecting step;
    another specifying step of specifying other elements different from the first element and the second element in accordance with an instruction from the user that is based upon a notification given by said notifying step; and
    a re-selecting step of selecting another output-target element from the other elements.

21. The method according to claim 20, wherein in said notifying step, a display apparatus displays an area corresponding to the output-target element selected by said selecting step from a Web page displayed on the display apparatus based upon the structured document.

22. The method according to claim 17, further comprising outputting the output-target element selected by said selecting step in a form distinguishing the output-target element form other element among the first element and the second element.

23. The method according to claim 22, wherein in said outputting step, only the output-target element selected by said selecting step from among the plurality of elements included in the structured document is outputted.

24. The method according to claim 22, wherein in said outputting step, in a form distinguishable from each other, both the output-target element selected by said selecting step and the other element among the first element and the second element are outputted.

25. The method according to claim 17, wherein in said selecting step, the output-target element is selected from the first element and the second element on the basis of the sizes of the first area and the second area on the Web page based upon the structured document, and content of text contained in each element.

26. The method according to claim 17, wherein, in said selecting step, the output-target element is selected so that the second element is selected in a case where a ratio of the first size with respect to the second size is equal to or smaller than a predetermined ratio and so that the first element is selected in a case where the ratio is larger than the predetermined ratio.

* * * * *